(12) United States Patent
Ryan et al.

(10) Patent No.: US 8,051,237 B2
(45) Date of Patent: Nov. 1, 2011

(54) MULTIPLE PURPOSE INTEGRATED CIRCUIT

(75) Inventors: Stuart Andrew Ryan, Bristol (GB); Andrew Michael Jones, Bristol (GB)

(73) Assignee: STMicroelectronics Limited, Marlow (GB)

( * ) Notice: Subject to any disclaimer, the term of this patent is extended or adjusted under 35 U.S.C. 154(b) by 955 days.

(21) Appl. No.: 11/682,230

(22) Filed: Mar. 5, 2007

(65) Prior Publication Data

US 2007/0262653 A1 Nov. 15, 2007

(30) Foreign Application Priority Data

Mar. 3, 2006 (EP) .................................. 06251162

(51) Int. Cl.
*G06F 13/36* (2006.01)
*G06F 1/00* (2006.01)

(52) U.S. Cl. ....................... 710/315; 713/324

(58) Field of Classification Search .......... 713/300–340; 710/316–317

See application file for complete search history.

(56) References Cited

U.S. PATENT DOCUMENTS

| | | | | |
|---|---|---|---|---|
| 5,226,125 A * | 7/1993 | Balmer et al. | ............... | 710/317 |
| 5,815,647 A | 9/1998 | Buckland et al. | | |
| 5,862,404 A * | 1/1999 | Onaga | ............... | 710/8 |
| 6,073,195 A * | 6/2000 | Okada | ............... | 710/301 |
| 6,085,328 A * | 7/2000 | Klein et al. | ............... | 713/310 |
| 6,622,220 B2 * | 9/2003 | Yoshida et al. | ............... | 711/152 |
| 6,754,716 B1 * | 6/2004 | Sharma et al. | ............... | 709/238 |
| 6,877,061 B2 * | 4/2005 | Thibault et al. | ............... | 710/312 |
| 6,996,651 B2 * | 2/2006 | Garinger et al. | ............... | 710/305 |
| 7,062,559 B2 * | 6/2006 | Yoshimura et al. | ............... | 709/226 |
| 7,069,376 B2 * | 6/2006 | Mathewson et al. | ............... | 710/316 |
| 7,143,196 B2 * | 11/2006 | Rimmer et al. | ............... | 709/249 |
| 7,277,953 B2 * | 10/2007 | Wils et al. | ............... | 709/229 |
| 7,328,298 B2 * | 2/2008 | Kamakura et al. | ............... | 710/305 |
| 7,366,784 B2 * | 4/2008 | Ishizaki | ............... | 709/228 |
| 7,502,842 B2 * | 3/2009 | Graham et al. | ............... | 709/223 |

(Continued)

FOREIGN PATENT DOCUMENTS

WO WO 9832291 A1 * 7/1998

OTHER PUBLICATIONS

Networks on Chips: Scalable Interconnections for future systems on chips, 2003, Ali et al, pp. 1-6.*

(Continued)

*Primary Examiner* — Paul R Myers
(74) *Attorney, Agent, or Firm* — Lisa K. Jorgenson; Jeremiah J. Baunach; Seed IP Law Group PLLC (57) ABSTRACT

An integrated circuit of the type comprises a plurality of units that may act as initiators and targets. At least some of the units are for a first purpose such as a cable modem function and others are for a second purpose such as television data processing. The units are connected together by a interconnect comprising a number of nodes. One of the nodes is configurable such that requests made from initiator units on one side of the node to target units on the other side of the node are not sent to the target units. The units for the first purpose are arranged on the opposite side of the node from those of the second purpose, so that the circuit is effectively configurable into two separate logical partitions, one partition for television data processing and the other partition for cable modem functions.

28 Claims, 8 Drawing Sheets

U.S. PATENT DOCUMENTS

| | | | |
|---|---|---|---|
| 7,509,401 B2* | 3/2009 | Takamoto et al. | 709/220 |
| 7,539,124 B2* | 5/2009 | Rhim et al. | 370/208 |
| 7,581,021 B2* | 8/2009 | Errickson et al. | 709/238 |
| 7,633,955 B1* | 12/2009 | Saraiya et al. | 370/401 |
| 7,733,771 B2* | 6/2010 | Clermidy et al. | 370/230 |
| 7,752,378 B2* | 7/2010 | Fukumura et al. | 710/317 |
| 2002/0010881 A1 | 1/2002 | White | |
| 2004/0088599 A1 | 5/2004 | Matsui et al. | |
| 2004/0193906 A1* | 9/2004 | Dar et al. | 713/200 |
| 2004/0252722 A1* | 12/2004 | Wybenga et al. | 370/474 |
| 2005/0185642 A1* | 8/2005 | Rhim et al. | 370/389 |
| 2005/0210333 A1 | 9/2005 | Allue et al. | |
| 2005/0235084 A1* | 10/2005 | Nariai | 710/110 |
| 2006/0067218 A1* | 3/2006 | Clermidy et al. | 370/230 |
| 2006/0146857 A1* | 7/2006 | Naik et al. | 370/432 |
| 2009/0102534 A1* | 4/2009 | Schmid et al. | 327/292 |
| 2009/0201925 A1* | 8/2009 | Rhim et al. | 370/389 |

OTHER PUBLICATIONS

Network on a chip, Mar. 15, 2001, School of engineering Jonhoping University Shashi Kumar, pp. 1-19.*

Moore's lore, Feb. 8, 2005 Posted by Dana pp. 1-5.*

"SonicsMX Smart Interconnect—Product Brief," URL: http://web.archive.org/web/20050302201409/www.sonicsinc.com/sonics/products/smx/SonicsMX_Product_Brief.pdf, retrieved Jan. 19, 2007, pp. 1-2.

Wingard, D., "A Non-Blocking Intelligent Interconnect for AMBA-Connected SoC's," URL: http://web.archive.org/web/20051230154938/http://www.ocpip.org/pressroom/schedule/speaking/papers_presentations/Sonics_NonBlockingIntelligentInterconnect_AMBA.pdf, retrieved Jan. 17, 2007, pp. 1-39.

* cited by examiner

MULTIPLE PURPOSE INTEGRATED CIRCUIT

BACKGROUND OF THE INVENTION

1. Field of the Invention

The present invention relates to semiconductor integrated circuits, and in particular to integrated circuits used in devices providing multiple purposes to end users, such as television, audio, Internet access, telephone service and the like.

2. Description of the Related Art

Increasingly, consumer products are being developed as multiple purpose devices. Examples include using mobile telephones to function as MP3 players, cameras & radios, using portable storage devices as media players and using television "set top boxes" as devices to access the Internet and provide telephone services. In such devices, the different purposes can be provided by different integrated circuits, or increasingly by multiple purpose integrated circuits.

Integrated circuits (computer chips) that support digital television often have extensive mechanisms for protecting encrypted data against viewing or distribution by or to devices that are not entitled to do so. These "conditional access" systems employ a significant amount of hardware to protect these systems against attack by persons wanting to view, distribute or sell systems that can circumvent security for third parties.

Computer chips that support cable modem applications, which deliver high-speed Internet access using a common cable with the cable that delivers digital television, also support security mechanisms. The drive for cost reduction through super-integration and the focus that cable companies have on selling multiple services to each consumer (telephone, television and internet) has lead to the integration of cable modem and set-top box functions in a single chip.

BRIEF SUMMARY OF THE INVENTION

We have appreciated the need to provide integrated circuits capable of providing multiple purposes or services, such as those discussed above to end users. We have also appreciated, though, that where possible real-time functions of each service should be isolated to provide robustness in each service.

We have appreciated, for example, that most consumers prefer the performance of the telephone and internet service to be independent of the activity on their television and that a malfunction on one service should allow all other services to continue unaffected.

One embodiment of the invention allows selected services provided by different parts of a chip to be selectively isolated from one another, thereby allowing each service to continue in the event of failure or degradation of the service provided by another part. The embodiment can be implemented in a variety of different chips, though the preferred application is in a chip used for both cable modem and conditional access television purposes. In this application, the functions provided by a single integrated circuit related to the two functions that are commonly implemented on different chips (the cable modem, telephone and TV/Video functions), are isolated so as not interfere with each other. A malfunction in one function does not affect the other.

The preferred embodiment comprises a plurality of units that may act as initiators and targets. At least some of the units being for a first purpose such as a cable modem function and others being for a second purpose such as television data processing. The units are connected together by an interconnect bus comprising a number of nodes. At least one of the nodes is configurable such that requests made from initiator units on one side of the node to target units on the other side of the node are not sent to the target units. In practice, multiple nodes will be so configured forming an interconnect that can be configured as above. The units for the first purpose are arranged on the opposite side of the interconnect from those of the second purpose, so that the circuit is effectively configurable into two separate logical partitions, one partition for television data processing and the other partition for cable modem functions.

The logical partitions so formed are thereby arranged so that units within each partition can communicate with one another along the interconnect or bus, but units from one partition cannot communicate with units in the other. This provides a single chip having effective independent operability for two different purposes.

In addition to the interconnect nodes not sending requests from one side of the logical partition to the other, the bus nodes can follow normal bus protocol and provide a response to the initiator unit. Such a response must be appropriate to the bus protocol and will typically be an error message, power down message, isolate message or the like. Accordingly, every request from one side of the partition to the other will automatically receive an error message or the like as a response. An alternative would be for all such responses to be that the target is "busy" but this is not preferred.

BRIEF DESCRIPTION OF THE SEVERAL VIEWS OF THE DRAWINGS

An embodiment of the invention will now be described, by way of example only, and with reference to the accompanying figures, in which.

DETAILED DESCRIPTION OF THE INVENTION

The invention may be embodied in an integrated circuit used in a variety of different devices used for multiple purpose applications. In embodiments, each purpose may be a different service or function provided to an end user, such as telephone, video, audio, Internet access and so on. The preferred embodiment relates to an integrated circuit providing two functions: cable modem and television. The embodying device is a conditional access unit commonly referred to as a "set top box", that is a device that provides access to broadcast services, such as television, only if various conditions are met.

A wide variety of techniques for broadcast transmission are known in which the broadcast signal is encoded, scrambled or encrypted in some way to allow only authorized recipients to retrieve the original signal. One particular field in which this area has been researched is broadcast television.

The broadcast of television signals in which only permitted or authorized recipients can produce the clear television picture from those signals is known as Conditional Access Television or Pay-TV. In this context, broadcast can include over-air, via satellite, by cable or indeed any appropriate distribution medium in which the same signal content is sent to many recipients. Television signals may be analog signals or digital signals. The term "scrambling" is often used for the process of rendering analog signals unusable until "descrambled", whereas the terms "encryption" and "decryption" are more often used for digital signals. In either case, the aim is to only allow users that have paid a subscription to descramble/decrypt the signals.

Figure 1:
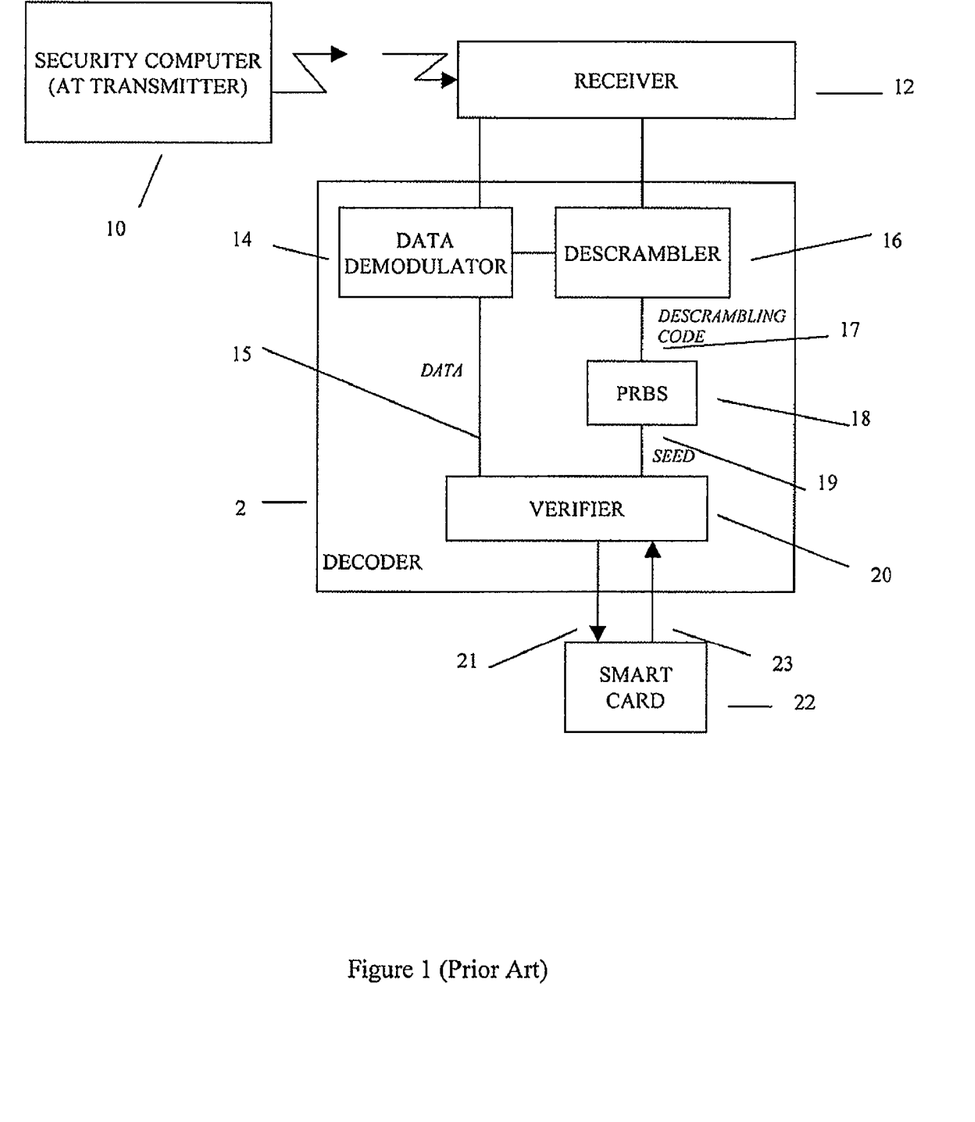
FIG. 1 shows a known conditional access television device (set top box) in which the invention may be implemented.

A known system and receiver in which the invention may be embodied is illustrated in FIG. 1. The concept in this system is to broadcast signals (by cable) which can be received by anyone, but only rendered usable by recipients having a "set top box" decoder 2 and an associated smart card 22. The decoders 2 of all recipients are identical, but the smart cards 22 contain unique secrets, including entitlements, which specify which channels within the broadcast signals the user is permitted to watch. The system operates broadly as follows.

A television signal is broadcast over air in a scrambled form by a security computer 10 and includes a stream of control data describing how the television signal is to be descrambled. The television signals and control data are necessarily the same signal sent to all users. It is not feasible to send the signals uniquely scrambled/encrypted to each recipient as there may be tens of millions of users and this would require tens of millions of times the bandwidth. Accordingly, all recipients operate the same descrambling/decryption process. This is implemented in the decoder 2, which receives the broadcast signals from a receiver 12. A data demodulator 14 extracts the portion of the signal for picture and/or sound and provides this to a descrambler 16 for descrambling. The control data portion is extracted and provided to a verifier 20 over line 15. The control data comprises encrypted control words, which instruct the descrambler how to descramble the picture/sound signal. The control words are therefore decrypted, and it is for this purpose that the smart card 22 is provided.

The verifier 20 provides encrypted control words across an interface along line 21 to the smart card 22. The smart card 22 contains an algorithm, which, if the user is entitled to watch the chosen channel, decrypts the control words and provides them to the verifier 20 via line 23. The verifier passes the decrypted control words to a pseudo-random binary sequence (PRBS) generator 18 over line 19, which in turn provides a descrambling code over line 17 to the descrambler. It should be noted that the control words and hence the descrambling code change frequently (every few seconds). The security in this arrangement is thus that it is not feasible to try and decrypt the control words in real time without the smart card algorithm. Also, in the event that the smart card algorithm is compromised, then the smart cards themselves can be re-issued to all subscribers. Lastly, to view any channels, a user typically pays for "entitlements" which are broadcast over air addressed uniquely to each user and stored in the smart card 22.

The decoder 2 may provide services additional to the descrambling of television signals, such as telephony and cable modem services. As previously explained, this could be implemented by multiple different chips. The preferred embodiment, though, is to implement the functions of the data demodulator 14 and cable modem as a single chip referred to as a "cable modem chip". The functioning of the television descrambler is dependent, though, on the demodulation of the signal and so the embodiment provides flexible isolation of the demodulation and cable modem functions. In effect, the embodiment of the invention allows the cable modem chip to be logically partitioned into two independent chips. This allows a robust separation of functions and isolates malfunctions in one partition from another. The embodiment of the invention achieves this with minimal hardware over an optimal integrated non-partitionable implementation.

Figure 2:
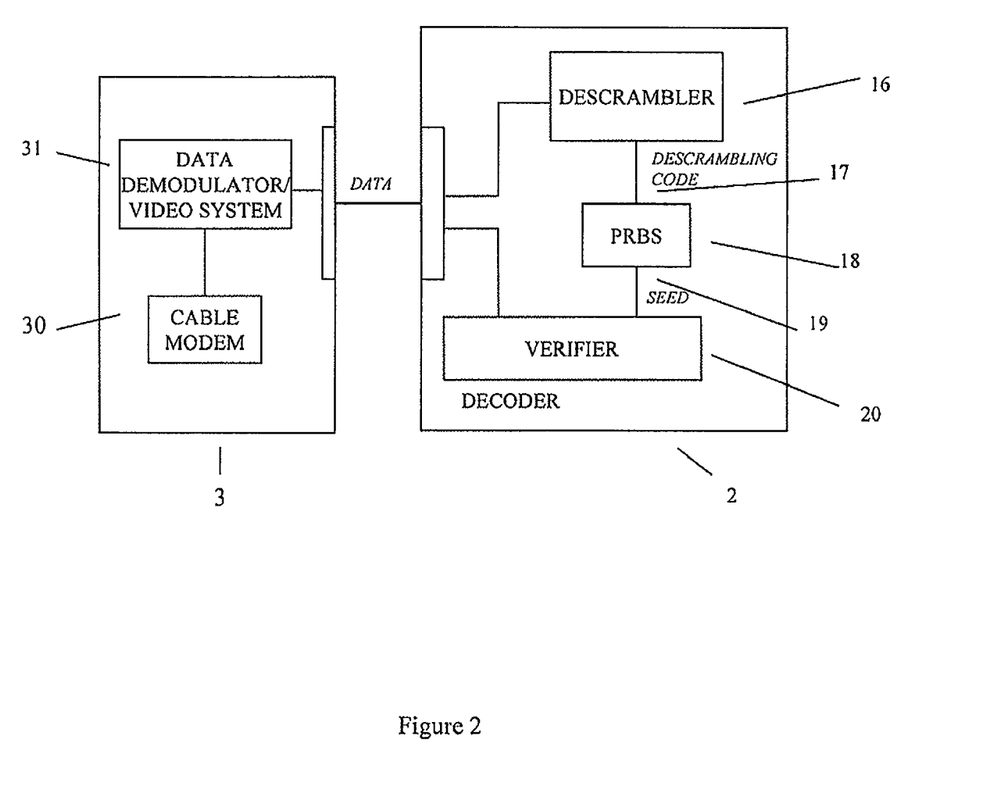
FIG. 2 shows the functional components of an integrated circuit according to one embodiment the invention.

A cable modem chip (integrated circuit) 3 according to one embodiment of the invention is shown in FIG. 2. The integrated circuit 3 comprises a data demodulator unit 31 implemented by QAM (Quadrature Amplitude (de)Modulator) circuits. A cable modem unit 30 provides the functions that provide Internet connectivity. As can be seen, the demodulation function for the video stream is provided on the cable modem chip 3 and the data transferred to the decoder circuit 2 over an interface. The cable modem chip 3 thus feeds raw data to the decoder chip and provides a front end to services such at the Internet. In the event of failure of the cable modem chip 3, though, the decoder chip 2 would no longer be able to function. This is because the cable modem chip 3 is performing multiple purposes: modem and video.

Figure 3:
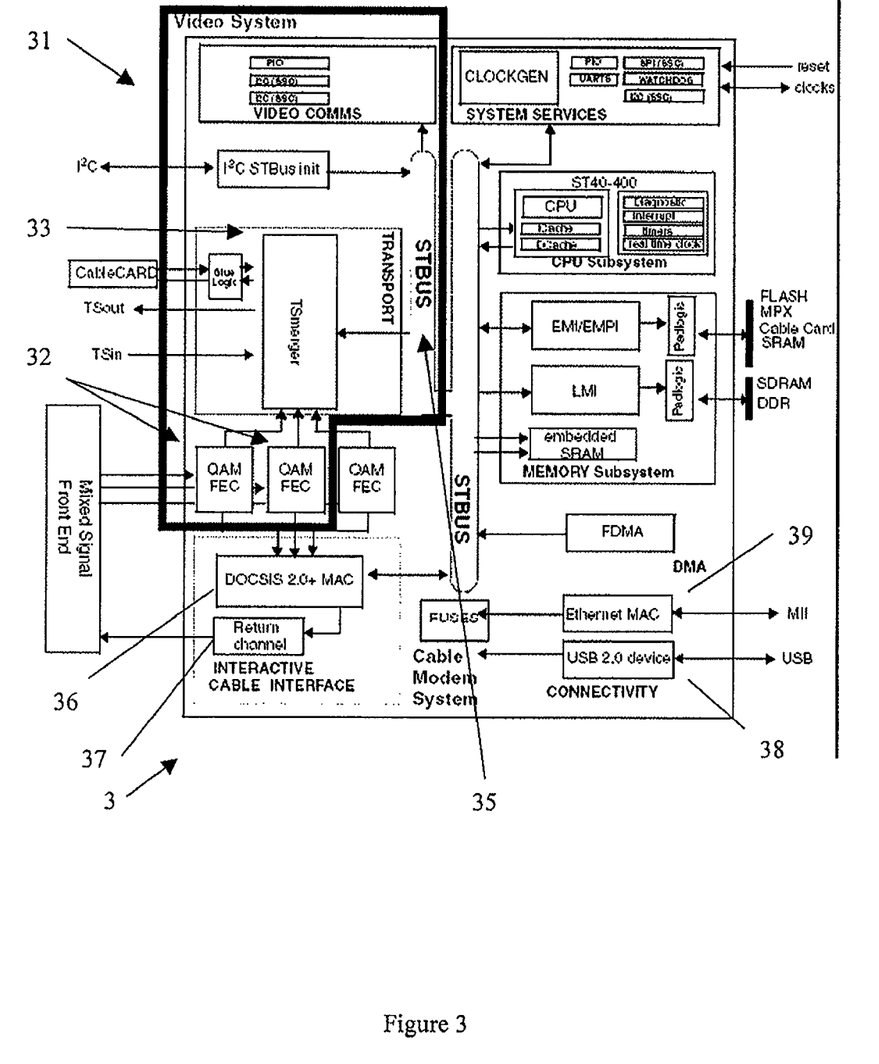
FIG. 3 shows a more detailed view of the circuit of FIG. 2.

The cable modem chip 3 is shown in greater detail in FIG. 3. Only the main components are numbered for ease of understanding. The data demodulator/video system 31 (shown surrounded by a thick line) comprises QAM units 32 which demodulate an incoming mixed signal and provide it to a transport unit 33. The transport unit is connected to an interconnect in the form of a bus 35 common to the whole chip including the cable modem system functions. It is noted that the terms "interconnect" and "bus" are often used interchangeably, though the term interconnect is understood to be the generic name for a bus or network on chip. The bus 35 provides the connectivity between all units within the circuit and also provides the key feature that enables the chip to be effectively logically partitioned into two independent chips. An interface provides video data out to be descrambled by a separate decoder chip.

A Docsis2+ protocol unit 36 and a return channel unit 37, also connected to the bus 35, implement the cable modem functions of the circuit 3. The circuit may be connected to external devices by USB interface 38 or Ethernet interface 39. The remainder of the circuit 3 need not be described further and comprises subsystems for memory, CPU and system services.

As can be seen, the bus 35 connects all circuit components, notably connecting between the data demodulator/video system 31 and the remainder of the circuit. The bus 35 is provided with a facility for power management that allows ports to be powered-down such that subsequent access to such ports will be responded to with appropriate errors. The embodiment uses this functionality to provide selective partitioning of the chip. This is achieved by alteration of the functioning of the bus 35 at a chosen point so as to make each side of the bus appear as powered-down to the other side of the bus. Any requests made across this chosen point will thus receive an appropriate error as a response. This approach has the benefit of requiring minimum hardware alteration to a bus, whilst achieving effective logical partitioning.

Figure 4:
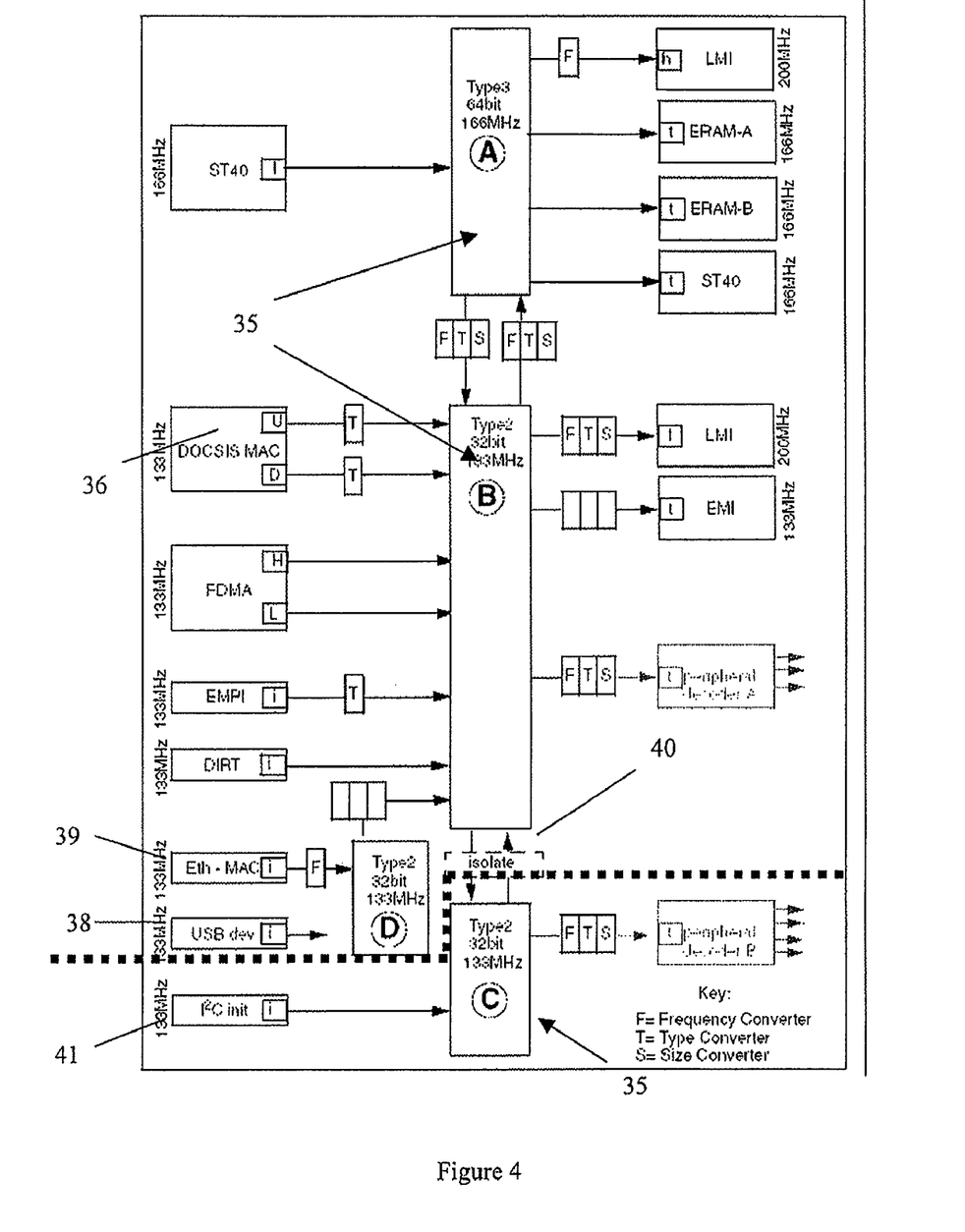
FIG. 4 shows the bus arrangement within the circuit of FIG. 3.

The partitioning can be seen more clearly in FIG. 4 which shows the components of FIG. 3 redrawn to emphasize the partitioning of the bus. As can be seen, the bus 35 is made up of multiple nodes and includes a logical isolation point 40 implemented by one or more nodes of the bus that allows one part of the bus to be logically isolated from another. As a result, the units on one side of a logical divide shown by a thick dashed line are isolated from another. The way that the nodes are structured means that multiple nodes may be involved in any particular request, the request being passed from one node to another until the node responsible for requests from the initiator is reached. The nodes together form an interconnect and, effectively, the interconnect or a portion of the interconnect is configurable to form the partitions. Multiple nodes may thus be configured to achieve this. The units on one side include the I²C unit 41 for video and on the other side, all the units for the cable modem functionality including Docsis2+ protocol unit 36, USB interface 38 and Ethernet interface 39. The isolation point 40 can be asserted at the choice of a manufacturer using the chip within a device either at the point of manufacture, or later during use by a software setting, for example during a boot sequence.

Figure 5:
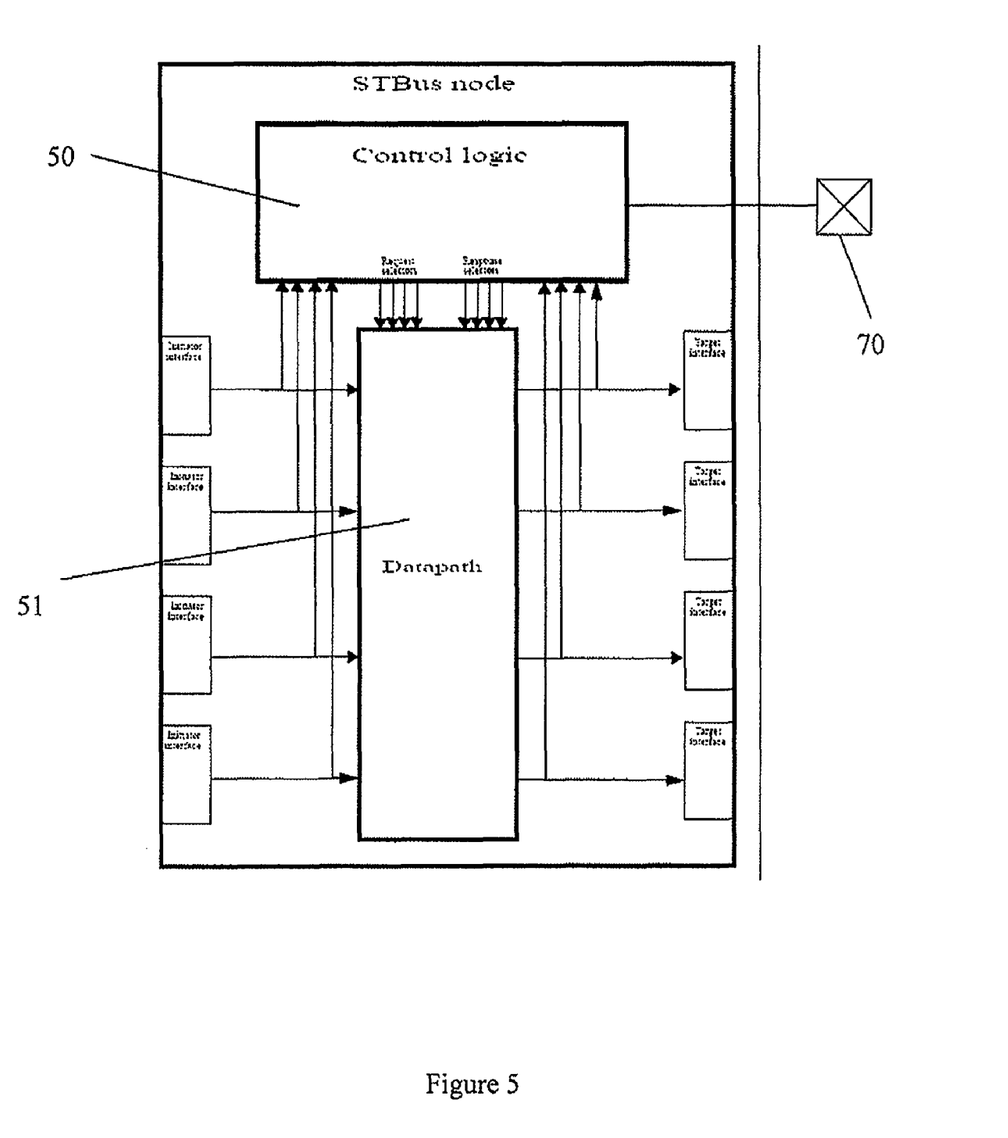
FIG. 5 shows a power management isolation unit in more detail.

The configuration of a node is further shown in FIG. 5. The bus node includes two main blocks: the control logic 50 and the datapath 51. The control logic 50 is the block responsible for the arbitration and the storage of required information, the datapath 51 is the routing network through which data and control signals flow from initiators to targets and vice versa. The node includes a connection by which the partitioned mode may be asserted, here shown as an additional chip pin 70 that can be used to assert whether or not the node is to be set in a partitioned or non-partitioned state. In the partitioned state, all requests across the node receive an error response. Alternatively, the partitioned state may be set by other methods such as setting one time programmable technology such as an anti-fuse to assert a signal of holding a software register. The signal is asserted such that the relevant nodes in the interconnect provide appropriate responses and form a logical partition. A preferred feature is that the partitioned state cannot be altered during operation of the integrated circuit. The signal asserted to create the partitioned state is preferably also used for other matters as well as setting the nodes.

Figure 6:
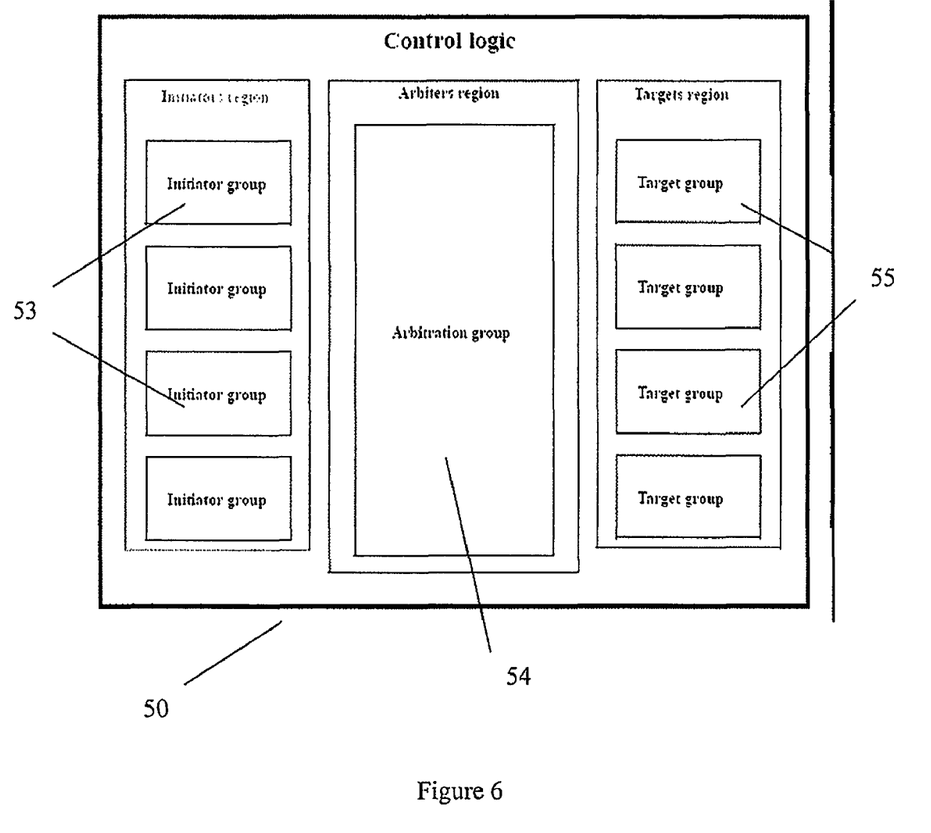
FIG. 6 shows the control logic within an isolation unit.

The node control logic 50 is responsible for the arbitration of the initiators requests and the generation of the signals used to proper multiplex the protocol signals across the datapath 51. The control logic, shown in FIG. 6, is internally organized in three main regions: the initiators region, the arbiters region and the targets region. The initiators region is composed of as many blocks as the number of initiators, each block being called initiator group 53, collecting a set of basic building blocks to be instantiated so many times as the number of initiators. The arbiters region is composed of a block called arbitration group 54. The targets region is composed of so many blocks as the number of targets, each block being called target group 54, collecting a set of basic building blocks to be instantiated as many times as the number of targets.

Figure 7:
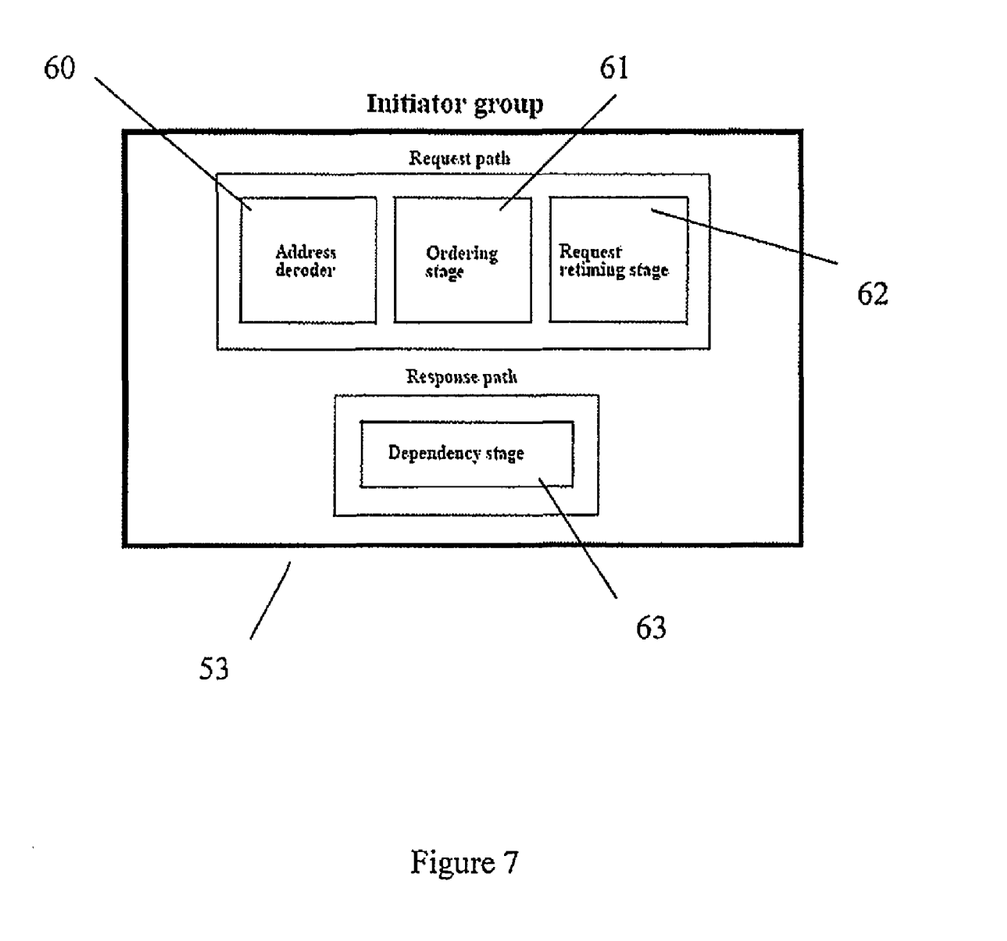
FIG. 7 shows an initiator group within the control logic of FIG. 6.

The sub-blocks that an initiator group is composed of are shown in FIG. 7 and are: address decoder 60; ordering stage 61; request retiming stage 62; dependency stage 63. The address decoder is responsible for the detection of the requests to access a target from an initiator and for the detection of errors if the requested targets are not accessible. The address decoder 60 is also responsible for the detection of errors in case of security violations and accesses to targets in power down mode.

Figure 8:
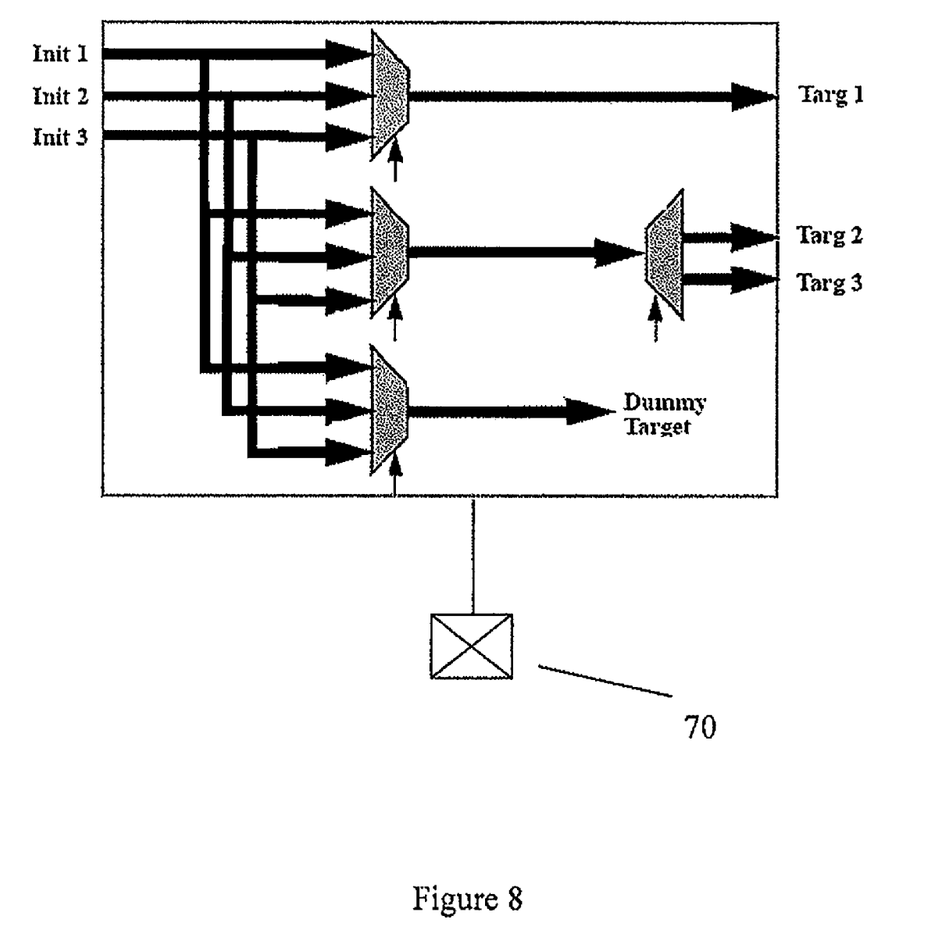
FIG. 8 shows an element in the data path in more detail.

Notice that the total number of targets is given by the number of external targets connected to the node plus the so called dummy target, a module internal to the node, acting as a target with a pipeline capability of one cell only, used to generate error response packets when errors are detected by the address decoder. FIG. 8 shows an example of a datapath of a node with the dummy target used to handle errors. The dummy target is seen as an additional target with a dedicated datapath. The additional pin 70 can be used to assert that all requests across the node are treated as errors. Effectively, this sets the node to respond as if the units on the other side of the partition were in a power down state. In this scheme, all target ports not in the requestor's partition will appear to be powered down.

The node has an array of inputs indicating power-down-state, generated by a low-power controller at the system level, each corresponding to a target on the node. The node contains a dummy target, which when accessed only replies with an error response. The address decoder inside the node accepts requests, decodes the address and forwards the address to the appropriate target. The power-down-state signals are connected to the address decoder. If the low-power controller asserts a power-down signal the address decoder will forward any requests to the dummy target, rather than to the desired target.

If an error condition occurs (such as the power down state), the address decoder will generate a request toward the dummy target, responsible to generate an error response packet, marked by a response opcode equal to 0×83, the cycle after the error request has been received. The number of response cells the error response packet is composed of depends on the type of the bus node. Once the addressed target has been detected (provided that the address issued by the initiator is in the correct range), the address decoder has to check that it is not in power down mode and that the attribute security bit is consistent with the target security status. If this is the case the one-hot encoding representing the selected target is propagated to the next stage of the node, otherwise the dummy target will be addressed.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. An integrated circuit comprising:
a plurality of units on a semiconductor substrate, at least some of the units being for a first purpose and others being for a second purpose; and
an interconnect connecting together the units, the interconnect comprising a number of nodes, wherein a configurable one of the nodes is configurable such that requests made from initiator units on one side of the configurable node to target units on the other side of the configurable node are not sent to the target units, the units for the first purpose being on the opposite side of the configurable node from those of the second purpose, wherein the integrated circuit is effectively configurable into two or more separate logical partitions, and wherein the interconnect has a power management system, and wherein the configurable node, under control of the power management system, is configurable such that requests made from the initiator units on the one side of the configurable node to the target units on the other side of the configurable node are handled as if the units on the other side of the configurable node were in a powered down mode by blocking requests made from the initiator units to the target units when the requests are handled as if the units on the other side of the configurable node were in a powered down mode.

2. An integrated circuit according to claim 1, wherein the requests made from initiator units on one side of the configurable node to target units on the other side of the node are responded to with a message indicating that the target units are unavailable.

3. An integrated circuit according to claim 2, wherein the message indicating that the target units are unavailable is an error message.

4. An integrated circuit according to claim 1, wherein the power management system includes a dummy target and wherein the configurable node is configurable such that requests made from the initiator units on the one side of the node to the target units on the other side of the node are sent to the dummy target.

5. An integrated circuit according to claim 1, wherein the configurable node is configurable by asserting a signal.

6. An integrated circuit according to claim 5, wherein the signal is asserted by a one time programming element.

7. An integrated circuit according to claim 5, wherein the signal is asserted by software.

8. An integrated circuit according to claim 5, wherein the configurable node is configurable by a connection to an external pin of the integrated circuit.

9. An integrated circuit according to claim 5, wherein the configurable node is configurable by a connection to the external pin during use such that the circuit is temporarily configurable into the two or more separate logical partitions.

10. An integrated circuit according to claim 1, wherein the first purpose relates to video processing.

11. An integrated circuit according to claim 1, wherein the second purpose relates to modem functions.

12. An integrated circuit according to claim 1, wherein the integrated circuit is a modem chip.

13. A device, comprising
a first integrated circuit chip that includes:
a plurality of units, at least some of the units being for a first purpose and others being for a second purpose; and
an interconnect connecting together the units, the interconnect comprising a number of nodes, wherein a configurable one of the nodes is configurable such that requests made from initiator units on one side of the configurable node to target units on the other side of the configurable node are not sent to the target units, the units for the first purpose being on the opposite side of the configurable node from those of the second purpose, wherein the integrated circuit is effectively configurable into two or more separate logical partitions, and wherein the interconnect has a power management system, and wherein the configurable node, under control of the power management system, is configurable such that requests made from the initiator units on the one side of the configurable node to the target units on the other side of the configurable node are handled as if the units on the other side of the configurable node were in a powered down mode by blocking requests made from the initiator units to the target units when the requests are handled as if the units on the other side of the configurable node were in a powered down mode.

14. A device according to claim 13, further comprising conditional access circuitry.

15. A device according to claim 13, further comprising a second integrated circuit chip coupled to the first integrated circuit chip and structured to communicate with at least one of the units.

16. A device comprising
a first integrated circuit chip that includes:
a plurality of units, at least some of the units being for a first purpose and others being for a second purpose; and
an interconnect connecting together the units, the interconnect comprising a number of nodes, wherein a configurable one of the nodes is configurable such that requests made from initiator units on one side of the configurable node to target units on the other side of the configurable node are not sent to the target units, the units for the first purpose being on the opposite side of the configurable node from those of the second purpose, wherein the integrated circuit is effectively configurable into two or more separate logical partitions, and wherein the interconnect has a power management system, and wherein the configurable node, under control of the power management system, is configurable such that requests made from the initiator units on the one side of the configurable node to the target units on the other side of the configurable node are handled as if the units on the other side of the configurable node were in a powered down mode by blocking requests made from the initiator units to the target units when the requests are handled as if the units on the other side of the configurable node were in a powered down mode, and wherein the power management system includes a dummy target and wherein the configurable node is configurable such that requests made from the initiator units on the one side of the node to the target units on the other side of the node are sent to the dummy target.

17. A device according to claim 16, further comprising conditional access circuitry.

18. A device according to claim 16, further comprising a second integrated circuit chip coupled to the first integrated circuit chip and structured to communicate with at least one of the units.

19. An integrated circuit, comprising:
an interconnect on a semiconductor substrate for connecting together a target unit with an initiator unit, the interconnect including:
a target interface coupled to the target unit;
an initiator interface coupled to the interface unit; and
a configurable controller having a partition mode and a non-partition mode, wherein in the non-partition mode, the controller is structured to transmit requests from the initiator interface to the target interface, and in the partition mode, the controller is structured to prevent requests from the initiator unit from being transmitted to the target unit and wherein, under control of a power management system, in the partition mode, the controller is further structured such that the requests made from the initiator unit to the target unit are handled as if the target unit was in a powered down mode by blocking requests made from the initiator unit to the target unit when the requests from the initiator unit to the target unit are handled as if the target unit was in a powered down mode.

20. An integrated circuit according to claim 19, wherein the target interface is one of a plurality of target interfaces respectively connected to a plurality of target units, and the initiator interface is one of a plurality of initiator interfaces respectively connected to a plurality of initiator units.

21. An integrated circuit according to claim 19, wherein the controller includes a configuration input structured to receive a configuration signal that causes the controller to enter the partition mode.

22. An integrated circuit according to claim 21, wherein the configurable input is connected to an external pin that receives the configuration signal that causes the controller to enter the partition mode.

23. An integrated circuit according to claim 19, wherein the target unit and initiator unit are integrated on a same chip as the interconnect.

24. An integrated comprising:
an interconnect on a semiconductor substrate for connecting together a target unit with an initiator unit, the interconnect including:
a target interface coupled to the target unit;
an initiator interface coupled to the interface unit; and
a configurable controller having a partition mode and a non-partition mode, wherein in the non-partition mode, the controller is structured to transmit requests from the initiator interface to the target interface, and in the partition mode, the controller is structured to prevent requests from the initiator unit from being transmitted to the target unit, and wherein, under control of a power management system, in the partition mode, the controller is further structured such that the requests made from the initiator unit to the target unit are handled as if the target unit was in a powered down mode by blocking requests made from the initiator unit to the target unit when the requests from the initiator unit to the target unit are handled as if the target unit was in a powered down mode, and wherein the initiator further includes a dummy target structured to receive the requests from the initiator unit to the target unit when in partition mode and, in response, transmit an error response to the initiator interface.

25. An integrated circuit comprising:
a plurality of units on a semiconductor substrate, at least some of the units being for a first purpose and others being for a second purpose; and
an interconnect connecting together the units, the interconnect comprising a number of nodes, wherein a configurable one of the nodes is configurable such that requests made from initiator units on one side of the configurable node to target units on the other side of the configurable node are not sent to the target units, the units for the first purpose being on the opposite side of the configurable node from those of the second purpose, wherein the integrated circuit has a power management system and is effectively configurable into two or more separate logical partitions, wherein the power management system includes a dummy target and wherein the configurable node is configurable such that requests made from the initiator units on the one side of the node to the target units on the other side of the node are sent to the dummy target and are handled as if the target units on the other side of the node were in a powered down mode by blocking requests made from the initiator units to the target units when the requests are handled as if the units on the other side of the node were in a powered down mode.

26. An integrated circuit according to claim 25, wherein the requests made from initiator units on one side of the configurable node to target units on the other side of the node are responded to with a message indicating that the target units are unavailable.

27. An integrated circuit according to claim 26, wherein the message indicating that the target units are unavailable is an error message.

28. An integrated circuit according to claim 25, wherein the configurable node is configurable by asserting a signal.

* * * * *

UNITED STATES PATENT AND TRADEMARK OFFICE
CERTIFICATE OF CORRECTION

| | | |
|---|---|---|
| PATENT NO. | : 8,051,237 B2 | |
| APPLICATION NO. | : 11/682230 | |
| DATED | : November 1, 2011 | |
| INVENTOR(S) | : Stuart Andrew Ryan et al. | |

It is certified that error appears in the above-identified patent and that said Letters Patent is hereby corrected as shown below:

On the Title Page Item 56

"Wingard, D. "A Non-Blocking Intelligent Interconnect for AMBA-Connected SoC's," URL: http://web.archive.org/web/20051230154938/http://www.ocpip.org/pressroom/schedule/speaking/papers_presentations/Sonics_NonBlockingIntelligentInterconnect_AMBA.pdf, retrieved Jan. 17, 2007, pp. 1-39." should read --Wingard, D. "A Non-Blocking Intelligent Interconnect for AMBA-Connected SoC's," URL: http://web.archive.org/web/20051230154938/http://www.ocpip.org/pressroom/schedule/speaking/papers_presentations/Sonics_NonBlockingIntelligentInterconnect_AMBA.pdf, retrieved Jan. 17, 2007, pp. 1-39.--.

Column 9, Line 1
"24. An integrated comprising:" should read --24. An integrated circuit comprising:--.

Signed and Sealed this
Fourteenth Day of February, 2012

David J. Kappos
*Director of the United States Patent and Trademark Office*